(12) United States Patent
Bayazit et al.

(10) Patent No.: US 7,272,291 B2
(45) Date of Patent: Sep. 18, 2007

(54) SPLICE CHIP DEVICE

(75) Inventors: Yilmaz Bayazit, Minneapolis, MN (US); Chad Raskovich, Shakopee, MN (US); Oscar Bran De Leon, Belle Plaine, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/212,492

(22) Filed: Aug. 25, 2005

(65) Prior Publication Data

US 2007/0047892 A1    Mar. 1, 2007

(51) Int. Cl.
*G02B 6/00* (2006.01)
(52) U.S. Cl. ......................... 385/135; 385/137
(58) Field of Classification Search ................ 385/135
See application file for complete search history.

(56) References Cited

U.S. PATENT DOCUMENTS

| | | | |
|---|---|---|---|
| 4,840,449 A | 6/1989 | Ghandeharizadeh | |
| 4,900,123 A | 2/1990 | Barlow et al. | |
| 5,074,635 A | 12/1991 | Justice et al. | |
| 5,115,489 A | 5/1992 | Norris | |
| 5,119,459 A | 6/1992 | Meyerhoefer et al. | |
| 5,185,845 A | 2/1993 | Jones | |
| 5,189,725 A | 2/1993 | Bensel, III et al. | |
| 5,222,184 A * | 6/1993 | Foss ............................ | 385/135 |
| 5,323,480 A | 6/1994 | Mullaney et al. | |
| 5,420,956 A | 5/1995 | Grugel et al. | |
| 5,450,518 A | 9/1995 | Burek et al. | |
| 5,472,160 A | 12/1995 | Burek et al. | |
| 5,490,229 A | 2/1996 | Ghandeharizadeh et al. | |
| 5,519,804 A | 5/1996 | Burek et al. | |
| 5,548,678 A | 8/1996 | Frost et al. | |
| 5,553,183 A | 9/1996 | Bechamps | |
| 5,553,186 A | 9/1996 | Allen | |

(Continued)

FOREIGN PATENT DOCUMENTS

DE    44 19 903 A1    12/1995

(Continued)

OTHER PUBLICATIONS

Exhibit A: Photo of splice tray and cover, and photo of opened splice tray, manufactured by 3M of St. Paul, Minnesota, 2 pages (publicly known prior to the filing date of the present application).

(Continued)

*Primary Examiner*—Michelle Connelly-Cushwa
*Assistant Examiner*—Rhonda S. Peace
(74) *Attorney, Agent, or Firm*—Merchant & Gould P.C.

(57) ABSTRACT

A splice tray arrangement including a tray and a splice chip. The splice chip includes a plurality of arms that define channels for holding splice elements. The arms include retaining structure for retaining a splice element in both of either one of an upper region and a lower region of a channel. The splice tray arrangement also includes a mounting arrangement for securing the splice chip to the tray at a mounting location. The mounting arrangement includes sliding interlock guides disposed on each of the splice chip and the tray. The mounting arrangement further includes flexible tabs arranged to prevent lateral movement of the splice chip when positioned at the mounting location.

33 Claims, 6 Drawing Sheets

U.S. PATENT DOCUMENTS

| | | | |
|---|---|---|---|
| 5,572,617 A | | 11/1996 | Bernhardt et al. |
| 5,577,151 A | | 11/1996 | Hoffer |
| 5,590,234 A | * | 12/1996 | Pulido .................. 385/135 |
| 5,647,045 A | | 7/1997 | Robinson et al. |
| 5,689,605 A | | 11/1997 | Cobb et al. |
| 5,790,741 A | | 8/1998 | Vincent et al. |
| 5,825,962 A | | 10/1998 | Walters et al. |
| 5,835,657 A | | 11/1998 | Suarez et al. |
| 5,870,519 A | | 2/1999 | Jenkins et al. |
| 5,896,486 A | | 4/1999 | Burek et al. |
| 5,917,984 A | | 6/1999 | Röseler et al. |
| 6,009,225 A | | 12/1999 | Ray et al. |
| 6,144,792 A | | 11/2000 | Kim et al. |
| 6,215,938 B1 | | 4/2001 | Reitmeier et al. |
| 6,226,436 B1 | | 5/2001 | Daoud et al. |
| 6,249,635 B1 | * | 6/2001 | Daoud .................. 385/137 |
| 6,249,636 B1 | * | 6/2001 | Daoud .................. 385/137 |
| 6,259,851 B1 | * | 7/2001 | Daoud .................. 385/135 |
| 6,285,815 B1 | * | 9/2001 | Daoud .................. 385/137 |
| 6,311,007 B1 | * | 10/2001 | Daoud .................. 385/135 |
| 6,370,309 B1 | * | 4/2002 | Daoud .................. 385/135 |
| 6,427,045 B1 | | 7/2002 | Matthes et al. |
| 6,456,772 B1 | * | 9/2002 | Daoud .................. 385/135 |
| 6,504,989 B1 | | 1/2003 | Gooding |
| 6,567,601 B2 | * | 5/2003 | Daoud et al. ............ 385/135 |
| 6,580,866 B2 | | 6/2003 | Daoud et al. |
| 6,687,450 B1 | * | 2/2004 | Kempeneers et al. ....... 385/135 |
| 6,701,056 B2 | | 3/2004 | Burek et al. |
| 6,788,871 B2 | | 9/2004 | Taylor |
| 6,798,966 B2 | * | 9/2004 | Loh .................. 385/134 |
| 6,801,704 B1 | * | 10/2004 | Daoud et al. ............ 385/136 |
| 6,845,207 B2 | | 1/2005 | Schray |
| 2002/0118944 A1 | | 8/2002 | Burns et al. |
| 2002/0159744 A1 | * | 10/2002 | Daoud .................. 385/135 |
| 2002/0191939 A1 | | 12/2002 | Daoud et al. |
| 2003/0091315 A1 | | 5/2003 | Allerellie |
| 2004/0240825 A1 | | 12/2004 | Daoud et al. |

FOREIGN PATENT DOCUMENTS

| | | |
|---|---|---|
| FR | 2 743 899 A1 | 7/1997 |
| GB | 2 367 378 | 3/2002 |

OTHER PUBLICATIONS

Exhibit B: Photo of splice tray manufactured by ADC Telecommunications, Inc. of Eden Prairie, Minnesota, 1 page (publicly known prior to the filing date of the present application).

Exhibit C: Photo of splice tray manufactured by Preformed Line Products of Cleveland, Ohio, 1 page (publicly known prior to the filing date of the present application).

Exhibit D: Splice Tray Kits, http://www.levitonvoicedata.com/catalog/BuildPage.aspx?BuildPageID=141, 2 pages (Copyright 2001-2004; publicly known prior to the filing date of the present application).

Exhibit E: Patching Splitter Tray, http://splitter.telecomosp.com/fiber1.cfm?Polybrands=fibcon-fibmanage-copnid-KR-310, 4 pages (publicly known prior to the filing date of the present application).

Exhibit F: Preformed Line Products, Splice Closures—Splice Cases, http://www.newtechindustries.com/newtech/preformed_line_products/splice_closures.htm, 3 pages (Jan. 27, 2005; publicly known prior to the filing date of the present application).

Exhibit G: Fiber Optics Fiber Apparatus Closures Accessories Trays, http://www.arrisistore.com/subcat.php?cat=EBACA&PHPSESSID=0a6023c3ce561b7d9, 8 pages (publicly known prior to the filing date of the present application).

Exhibit H: 3M FibrDome Closure Instructions, pp. 1-36 (Aug. 1995).

Exhibit I: Splice Trays. A LANscape® Solutions Product. Corning Cable Systems, 6 pages (publicly known prior to the filing date of the present application).

Exhibit J: Splice-through Fiber Trays, http://www.hubersuhner.com/products/hs-p-fo/hs-p-fo-inst/hs-p-fo-inst-lisa/hs-p-fo-inst-, 1 page (publicly known prior to the filing date of the present application).

* cited by examiner

SPLICE CHIP DEVICE

TECHNICAL FIELD

This disclosure relates generally to devices used in the telecommunications industry. More particularly, this disclosure relates to a splice tray having a splice chip for holding fiber optic splice elements.

BACKGROUND

A wide variety of telecommunication applications utilize fiber optic cables, and in turn involve fiber optic cable splicing and fiber optic cable storage. In these applications, a splice tray is often used to store spliced fiber optic cables. The splice trays commonly include a splice chip for holding or retaining the splice elements of the cables.

In general, improvement has been sought with respect to conventional splice tray arrangements, generally to better accommodate ease of use, to improve reliability of construction, and to increase the density of splice elements that can be stored and managed by the splice tray arrangement.

SUMMARY

One aspect of the present disclosure relates to a splice chip having a plurality of arms that define channels for holding splice elements. The arms are constructed to retain a splice element in both of either one of a first region and a second region of a channel. Another aspect of the present disclosure relates to a splice tray arrangement having a mounting arrangement for securing a splice chip to a tray at a mounting location. The mounting arrangement includes sliding interlock guides disposed on each of the splice chip and the tray. The mounting arrangement further includes flexible tabs arranged to prevent lateral movement of the splice chip when positioned at the mounting location.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to various features of the present disclosure that are illustrated in the accompanying drawings. Wherever possible, the same reference numbers will be used throughout the drawings to refer to the same or like parts.

Figure 1:
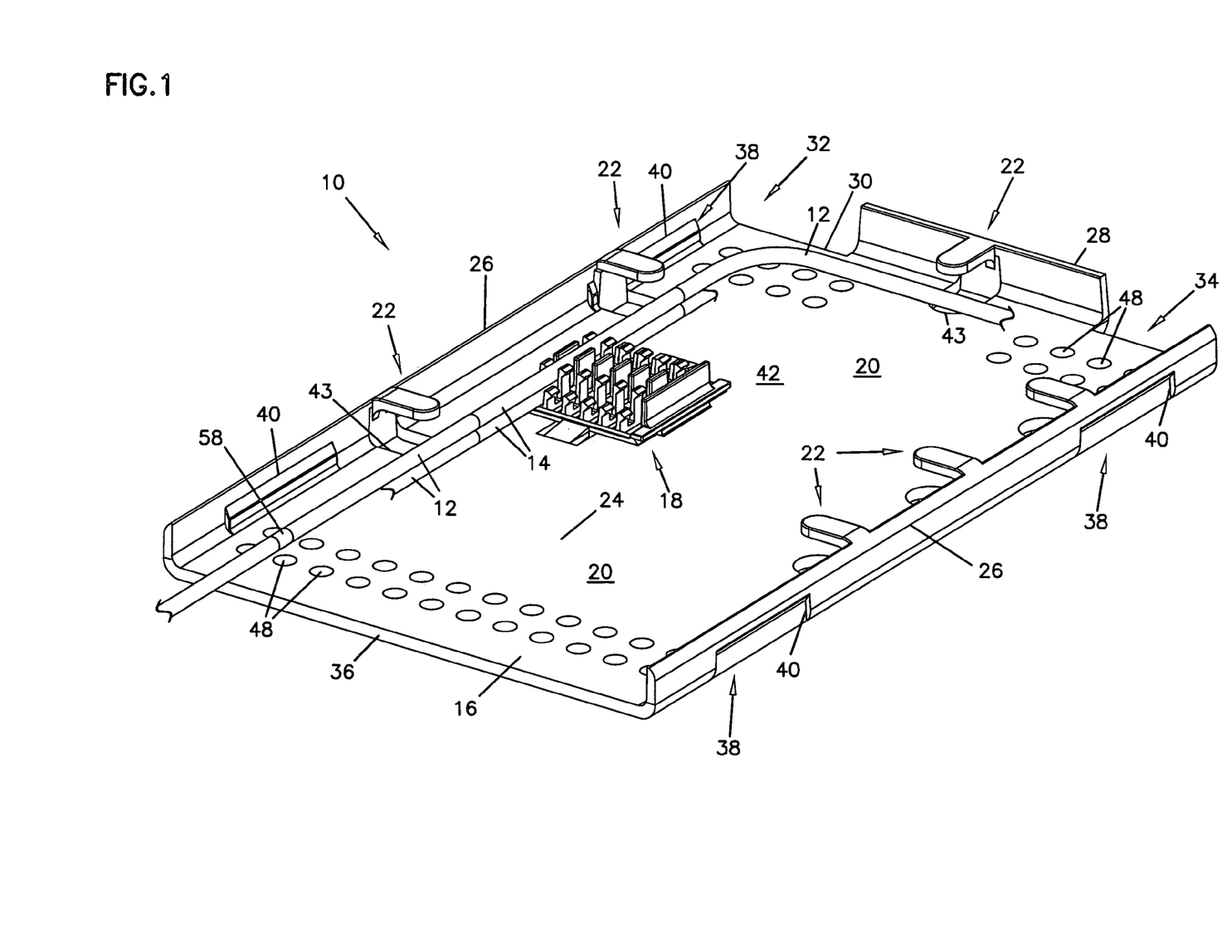
FIG. 1 is a perspective view of one embodiment of a splice tray arrangement, including one embodiment of a splice chip, according to the principles of the present disclosure.
Figure 6:
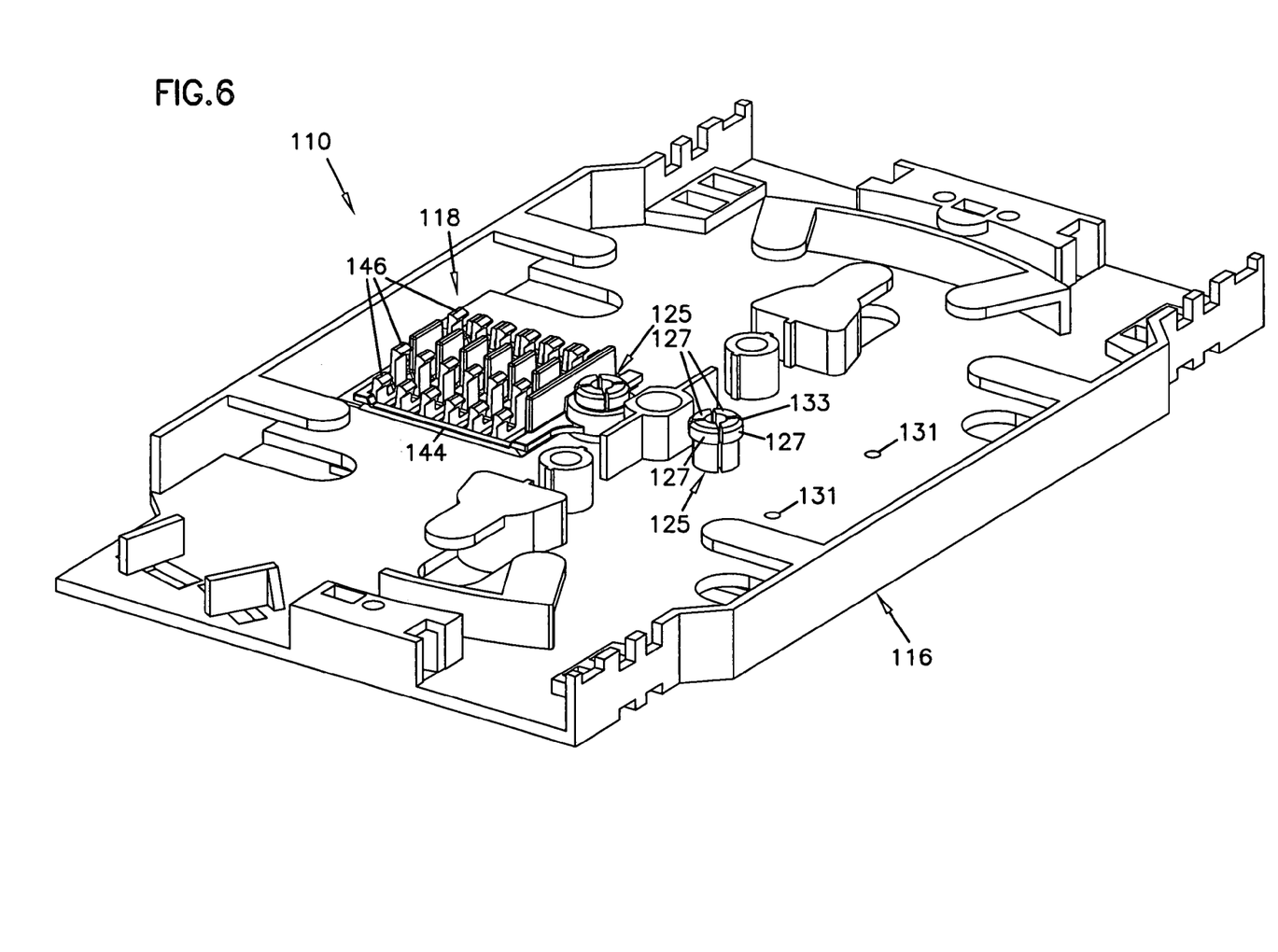
FIG. 6 is a perspective view of another embodiment of a splice tray arrangement, including another embodiment of a splice chip, according to the principles of the present disclosure.

FIGS. 1 and 6 illustrate embodiments of splice tray arrangements 10, 110 having features that are examples of how inventive aspects in accordance with the principles of the present disclosure may be practiced. One of the preferred features relates to increasing the density or capacity of the splice tray arrangement while maintaining effective cable management.

Referring to FIG. 1, a first embodiment of the splice tray arrangement 10 is illustrated. The splice tray arrangement 10 is used to house spliced fiber optic cables 12. In splicing fiber optic cables, two fiber optic cables are joined or spliced together by a splice element 14. The illustrated splice element 14 is a cylindrical, stranded heat shrink splice element used to join single-fiber cables. In accordance with the principles disclosed, the splice tray arrangement can be constructed and sized for use with other types of splice elements, such as mass fusion splice elements, for example.

The splice tray arrangement 10 of the present disclosure generally includes a base or tray 16 and a splice chip 18 for holding or retaining the splice elements 14. Often, in use, a generous portion of slack cable is provided to permit maintenance or replacement of the splice elements 14 without requiring cable replacement. The slack cable is stored in a storage region 20 within the tray 16. Cable management components 22, such as tabs, are located within the storage region 20 for retaining and managing the slack cable.

I. Tray

Referring still to FIG. 1, the tray 16 of the splice tray arrangement 10 includes a generally planar bottom surface 24. Tray sides extend upward from or perpendicular to the bottom surface 24. In the illustrated embodiment, the tray sides include two opposing tray sides 26 and a tray side 28 transverse to the two opposing tray sides 26. The transverse tray side 28 is centrally located at a first end 30 of the tray 16. First and second cable access openings 32, 34 are located at opposite corners of the first end 30 of the tray 16 adjacent to the transverse tray side 28. The first and second cable access openings 32, 34 each function as a cable entry and/or a cable exit. A second end 36 of the tray 16 is an open end. The second open end 36 also functions as a cable entry and/or a cable exit of the splice tray arrangement 10.

In use, the fiber optic cables 12 can enter and exit through any of the first open end 36, the first cable access opening 32, and the second cable access opening 34 of the tray 16. To manage the organization of cables entering and exiting the tray 16, the cables can be fixed at a particular entering and exiting location on the tray 16. In particular, apertures 48 are provided adjacent to the first open end 36 and the first and second cable access openings 32, 34 of the tray 16. A tie 58 or other securing device placed through the aperture(s) 48 can be used to tie or secure the cable 12 at the particular entering and exiting location.

The cable management components 22 (e.g. tabs) of the splice tray arrangement 10 are formed along each of the sides 26, 28 of the tray 16. The tabs 22 retain cables within an interior 42 of the tray 16. In the illustrated embodiment, slots 43 are formed in the bottom surface 24 of the tray 16 opposite each of the tabs 22 for manufacturing purposes.

The splice tray arrangement 10 can further include a cover (not shown). The tray 16 includes cover attachment structure 38 constructed to receive mating structure of the cover for securing the cover to the tray. In the illustrated embodiment, the cover attachment structure 38 includes openings 40 formed in at least one of the opposing sides 26 of the tray 16. In an alternative embodiment, the cover attachment structure 38 can be formed in the transverse side 28 of the splice tray 16.

The tray 16 of the splice tray arrangement 10 is preferably a molded construction. The tray 16 can be molded from common engineering materials including common engineering polymers such as polybutylene terephthalate (PBT), polycarbonate (PC), polyethylene ether (PPE), and polystyrene (PS), for example.

II. Splice Chip

Figure 2:
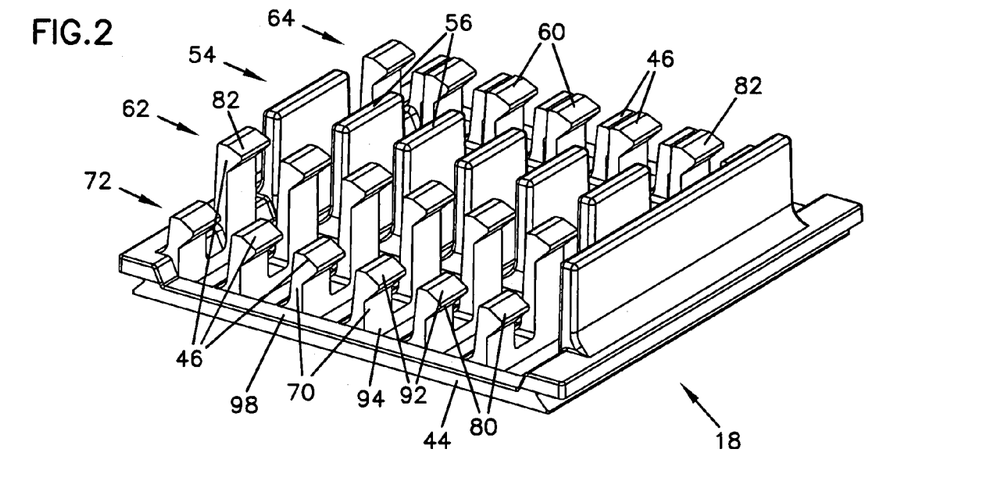
FIG. 2 is a side perspective view of the splice chip of FIG. 1.
Figure 3:
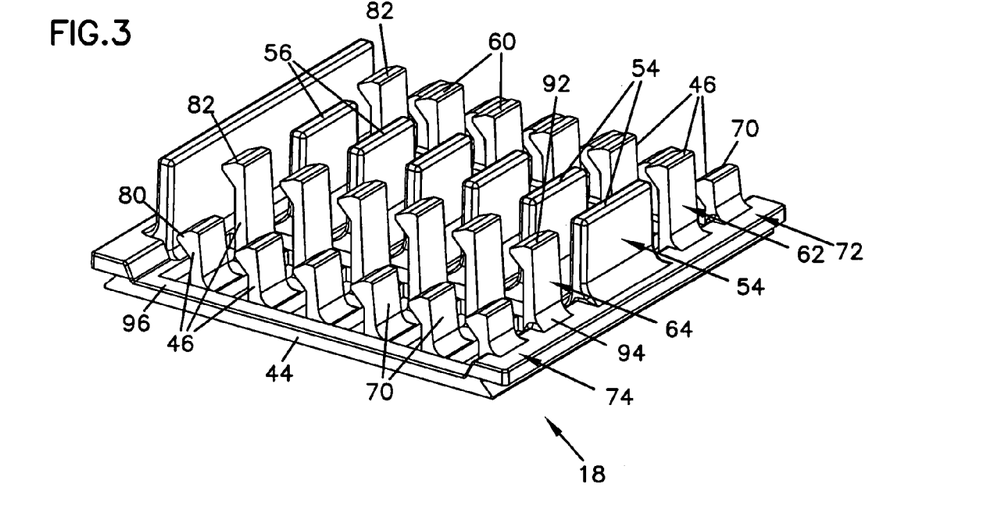
FIG. 3 is an opposite side perspective view of the splice chip of FIG. 2.
Figure 4:
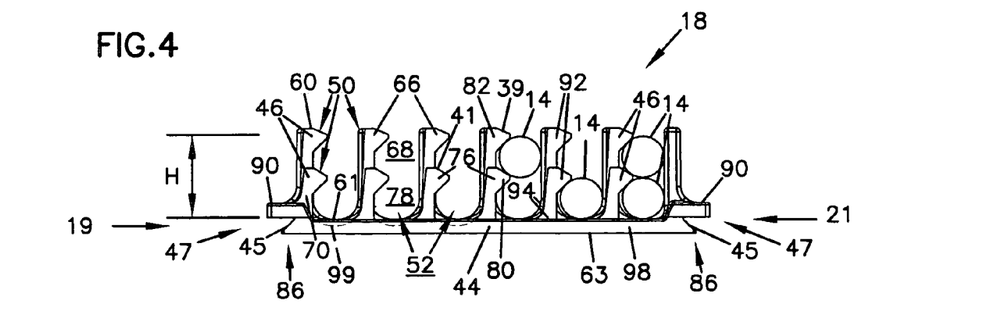
FIG. 4 is side elevation view of the splice chip of FIG. 2.

FIGS. 2-4 illustrate the splice chip 18 of the splice tray arrangement 10. The splice chip 18 includes a base 44 and a plurality of arms 46. The base 44 has a top side 61 (FIG. 4) and a bottom side 63. The plurality of arms 46 extend or protect upward from the top side 61 of the base 44. Each of the arms 46 has a free end 92 and an opposite end 94 formed integral with the base 44. The arms 46 define slots or channels 52 (FIG. 4) within which the splice elements 14 are placed and held. As shown in FIG. 4, each of the channels 52 runs parallel to one another. In the illustrated embodiment, the splice chip 18 includes six parallel channels 52.

One feature of the present splice tray arrangement 10 is that splice density is increased without having to reduce storage capacity. In particular, the splice chip 18 is designed to hold multiple splice elements 14 within a particular channel or slot 52. In the illustrated embodiment, the arms 46 of the splice chip 18 are configured to hold multiple splice elements 14 in a stacked relationship. What is meant by stacked relationship is that that elements 14 are located adjacent to one another, for example, in an upper/lower arrangement or a forward/rearward arrangement, depending upon whether the tray 16 is oriented horizontally or vertically.

Referring to FIGS. 2 and 3, the arms 46 of the splice chip 18 include a plurality of longer arms 60 arranged in first and second rows of longer arms 62, 64 and a plurality of shorter arms 70 arranged in first and second rows of shorter arms 72, 74. The first and second rows of longer arms 62, 64 are inner rows, and the first and second rows of shorter arms 72, 74 are outer rows. A row 54 of dividers 56 is located between the first and second rows of longer arms 62, 64.

The channels 52 of the splice chip 18 are each partially defined by at least one longer arm 60, at least one shorter arm 70, and one divider 54. As shown in FIG. 4, the channels 52 have a height H. The height H is defined by the longer arms 60 of the plurality of arms 46. Preferably, the height of the channels 52 accommodates receipt of multiple splice elements 14. In the illustrated embodiment, the height H is at least about 0.220 inches to accommodate receipt of two splice elements 14, each having a diameter of about 0.110 inches. The number of splice elements 14 positionable within one channel 52 is generally determined by the height of the longer arms 60 of the splice chip 18. The height of the longer arms 60 is in turn typically determined by the profile height of the tray 16. As can be understood, the disclosed principles can accordingly be applied in a variety of sizes and applications.

Still referring to FIG. 4, the splice chip 18 preferably includes retaining structure 50 for retaining the splice elements 14 within the channels 52. More preferably, the retaining structure 50 of the splice chip 18 includes first and second retaining structures: a first retaining structure 76 arranged to retain a splice element 14 in a first lower region 78 of each channel 52; and a second retaining structure 66 arranged to retain a splice element 14 in a second upper region 68 of each channel 52. While referred to as upper and lower regions, it will be appreciated that the regions of the illustrated embodiment of the present disclosure need not be limited to upper and lower. Rather, the terms upper and lower are used for explanatory purposes of the illustrated embodiment. The regions may be considered forward or rearward regions depending upon the orientation of the tray, for example. Further, as discussed above, the height of the longer arms 60 can be varied to accommodate more than two splice elements; preferably, additional retaining structure is provided in such an alternative embodiment to retain a splice element in the additional region of the channel provided by the increased height of the longer arms.

Referring back to FIGS. 2 and 3, the first retaining structure 76 of the splice chip 18 includes tabs or heads 80 located at the free ends 92 of the shorter arms 70. The heads 80 are constructed and arranged to snap-fit the splice elements 14 securely within the lower regions 78 of the channels 52. The second retaining structure 66 of the splice chip 18 also includes tabs or heads 82 located at the free ends 92 of the longer arms 60. The heads 82 are constructed and arranged to snap-fit the splice elements 14 securely within the upper regions 78 of the channels 52. Accordingly, the illustrated splice chip 18, having six channels 52, can hold twelve splice elements 14 when each of the upper and lower regions 68, 78 of the channels 52 are utilized.

Referring again to FIG. 4, although each of the channels 52 is configured to receive multiple splice elements 14, the retaining structure 50 of the splice chip 18 is configured to snap-fit only one splice element in a selected one of the lower region 78 and the upper region 68 if desired. In particular, only the lower region 78 of a particular channel 52 may contain a splice element 14 secured by the snap-fit construction of the first retaining structure 76 of a shorter arm 70. Likewise, only the upper region 68 of a particular channel 52 may contain a splice element 14 secured by the snap-fit construction of the second retaining structure 66 of a longer arm 60. When placed in the lower region 78, the splice element 14 rests upon first and second side edges 96, 98 (FIGS. 2 and 3) of the base 44. In some embodiments, the side edges 96, 98 can include detents or cut-outs 99 (represented by dashed lines in FIG. 4) that cradle the splice elements 14. When placed in the upper region 68, the splice element 14 rests upon the head 80 of a shorter arm 70.

As can be understood, preferably the arms 46 of the splice chip 18 are flexible to provide the snap-fit retaining feature previously described. The flexible construction of the arms 46, including both the shorter arms 70 and the longer arms 60, can be provided by either or both of the choice of manufacturing material, or the dimensional construction of the arms. Materials that can be used to manufacture at least the arms 46 of the splice chip 18, include common engineering polymers such as polybutylene terephthalate (PBT), polycarbonate (PC), polyethylene ether (PPE), and polystyrene (PS), for example.

In use, a splice element 14 is inserted into one of the channels 52 by pressing the splice element 14 downward upon a top ramped surface 39 (FIG. 4) of the head 82 of the longer arm 60. The downward force upon the ramped surface 39 flexes the longer arm 60 outward to accept the splice element 14 in the upper region 68. The splice element 14 can be retained within this upper region 68 or further inserted into the channel 52. The splice element 14 is further inserted into the channel 52 by pressing the splice element downward upon a top ramped surface 41 (FIG. 4) of the head 80 of the shorter arm 70, and flexing the shorter arm 70 outward to accept the splice element 14 in the lower region 78. In contrast to the flexible arms 46, the dividers 56 (FIG. 3) of the splice chip 18 can be made of a more rigid construction. The dividers 56, for example, do not include retaining structure (e.g. 50) and therefore are not required to flex or function as a snap-fit retainer.

III. Mounting Arrangement

Figure 5:
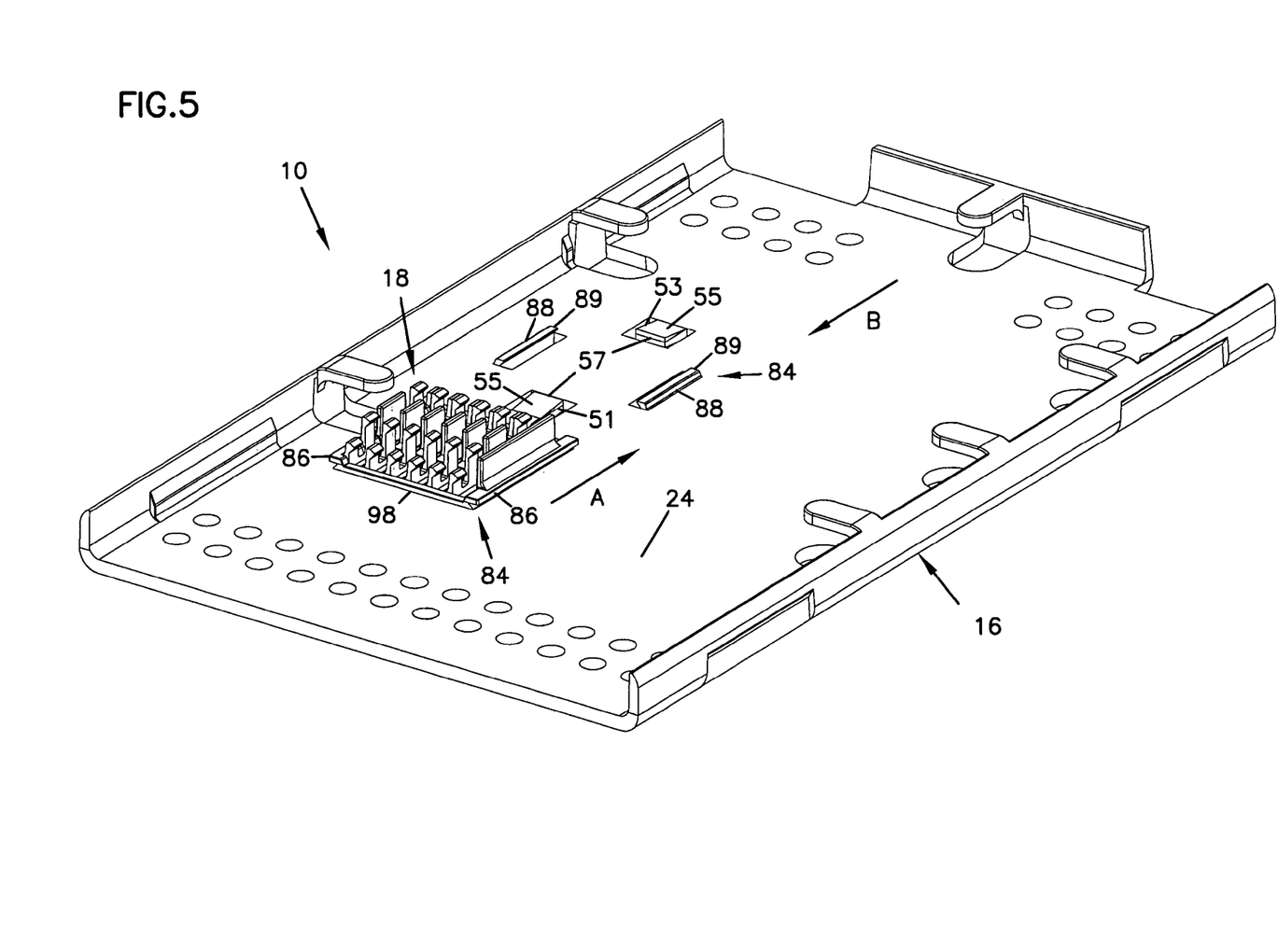
FIG. 5 is a perspective view of the splice tray arrangement of FIG. 1, showing placement of the splice chip.

Referring now to FIG. 5, the splice chip 18 of the present disclosure typically mounts to the bottom surface 24 of the tray 16. The splice tray arrangement 10 includes a mounting arrangement 84 that detachably secures the splice chip 18 to the bottom surface 24 without the use of adhesive or additional fasteners. The mounting arrangement 84 includes interlocking, longitudinal guides 86, 88 disposed on each of the splice chip 18 and tray 16.

Referring back to FIG. 4, the longitudinal guides 86 of the splice chip 18 include an integrally formed lip or ledge 90 located at opposite ends 19, 21 of the splice chip 18. The ledges 90 extend laterally outward beyond the ends of the base 44, and are offset or spaced a distance from the bottom side 63 of the base 44. The base 44 includes an angled portion 45 at each of the ends adjacent to the guides 86. An interlocking space 47 is provided between each of the guides 86 and the angled portions 45 of the base 44 at the ends 19, 21 of the splice chip 18.

Referring again to FIG. 5, the longitudinal guides 88 of the tray 16 include ribs or tracks 89 that project outward from the bottom surface 24 of the tray. In the illustrated embodiment, the tracks 89 are integrally formed in the bottom surface 24 of the tray 16. The tracks 89 have a cross-sectional configuration corresponding to the interlocking space 47 provided by the splice chip 18. The inverse, cross-section configuration of the tracks 89 slide within the interlocking spaces 47 of the splice chip 18 to secure the splice chip 18 to the bottom surface 24 of the tray 16.

When securing the splice chip 18 to the tray 16, the splice chip 18 slides in a lateral direction A, as shown in FIG. 5, such that the interlocking guides 86, 88 of the mounting arrangement 84 engage one another. In the alternative, the splice chip 18 can be secured to the tray 16 by sliding the splice chip 18 in an opposite lateral direction B. When the interlocking guides 86, 88 of the mounting arrangement 84 are engaged, the splice chip 18 is prevented from movement in a direction transverse to the bottom surface 24 of the tray.

The mounting arrangement 84 of the splice tray arrangement 10 also includes first and second securing tabs 51, 53. In the illustrated embodiment, the securing tabs 51, 53 are integrally formed in the bottom surface 24 of the tray 16. The securing tabs 51, 53 are preferably flexible, and each includes a ramped surface 55 and a shoulder surface 57.

During assembly of the splice tray arrangement 10, the splice chip 18 contacts the ramped surface 55 of the first securing tab 51 as the splice chip 18 slides in the lateral direction A. In particular, the base 44 of the splice chip 18 contacts the ramped surface 55 of the first securing tab 51 and biases or flexes the securing tab 51 to a position flush with the bottom surface 24. As the splice chip 18 continues to slide, and the interlocking guides 86, 88 of the splice chip 18 and tray 16 engage, the first side edge 96 (FIG. 3) of the base 44 contacts the shoulder surface 57 of the second securing tab 53.

The securing tabs 51, 53 are arranged to prevent the splice chip 18 from inadvertent lateral movement beyond a particular chip mounting location (defined between the tracks 89 of the mounting arrangement 84). In particular, the first and second securing tabs 51, 53 are arranged such that the second securing tab 53 functions as a stop while the first securing tab 51 snaps back in place to engage the second side edge 98 of the base 44 of the splice chip (see FIG. 1). The splice chip 18 is thereby contained within the particular chip mounting location by each of the tracks 89 and the shoulder surface 57 of each of the securing tabs 51, 53. The disclosed splice tray arrangement 10 provides an easy to use mounting arrangement that eliminates the need for adhesives or additional mounting fasteners. Yet, if desired, the construction of the base 44 of the splice chip 18 does not preclude use of adhesive or fasteners for mounting the splice chip 18 to the bottom surface 24 of the tray 16.

IV. Alternative Embodiment

Referring now to FIG. 6, a second embodiment of the splice tray arrangement 110 is illustrated. Similar to the previous embodiment, the splice tray arrangement 110 is used to house spliced fiber optic cables (e.g., 12 shown in FIG. 1). The splice tray arrangement 110 generally includes base or tray 116 and a splice chip 118 for holding or retaining the splice elements (e.g., 14 shown in FIG. 1).

The splice chip 118 is similar in construction to the splice chip 18 previously described with respect to the first embodiment of the invention. For example, referring to FIGS. 7-9, the splice chip 118 includes a base 144 and a plurality of arms 146 extending or protecting upward from a top side 161 (FIG. 9) of the base 144. The arms 146 define slots or channels 152 (FIG. 9) within which multiple splice elements 114 are placed and held.

Figure 7:
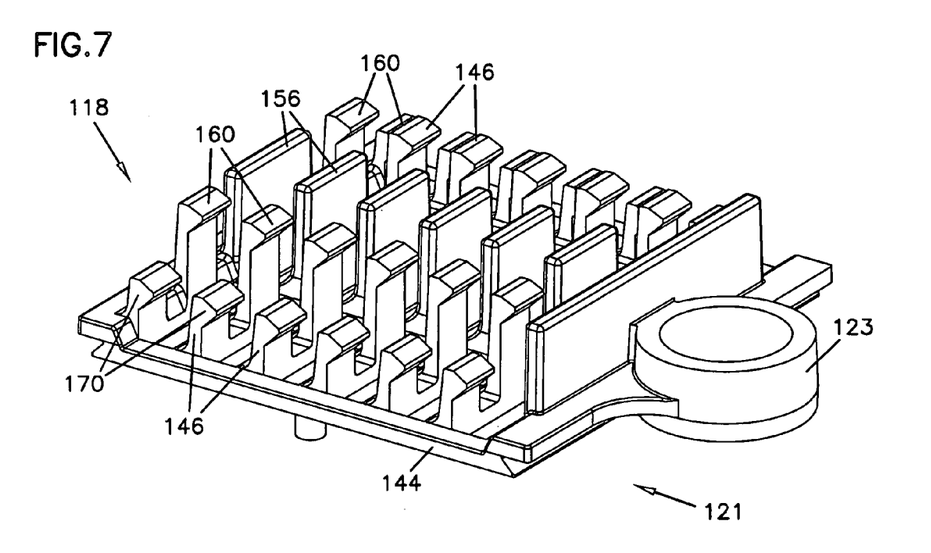
FIG. 7 is a side perspective view of the splice chip of FIG. 6.
Figure 8:
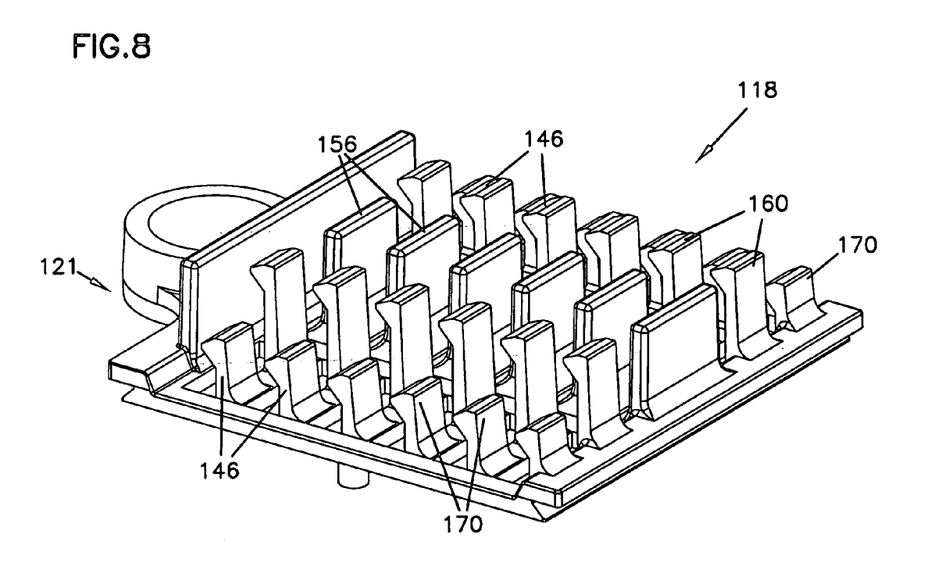
FIG. 8 is an opposite side perspective view of the splice chip of FIG. 7.
Figure 9:
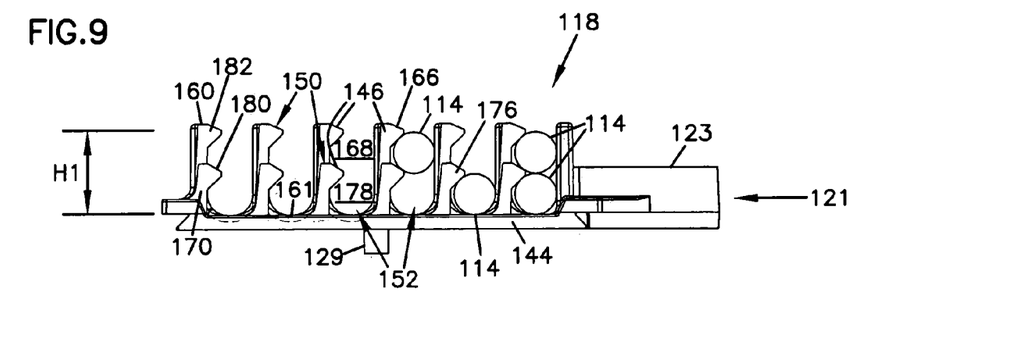
FIG. 9 is side elevation view of the splice chip of FIG. 7.

Referring to FIGS. 7 and 8, the arms 146 of the splice chip 118 include a plurality of longer arms 160, a plurality of shorter arms 170, and dividers 156. The channels 152 of the splice chip 118 are each partially defined by at least one longer arm 160, at least one shorter arm 170, and one divider 156. As shown in FIG. 9, the channels 152 have a height H1. The height H1 is defined by the longer arms 160 of the plurality of arms 146. Preferably, the height accommodates receipt of multiple splice elements.

Still referring to FIG. 9, the splice chip 118 also includes retaining structure 150 for retaining the splice elements 114 within the channels 152. Similar to the previous embodiment, the retaining structure 150 includes a first retaining structure 176, such as tabs or heads 180, arranged to retain a splice element 114 in a first lower region 178 of each channel 152. The retaining structure 150 also includes a second retaining structure 166, such as tabs or heads 182, arranged to retain a splice element 114 in a second upper region 168 of each channel 152.

Figure 10:
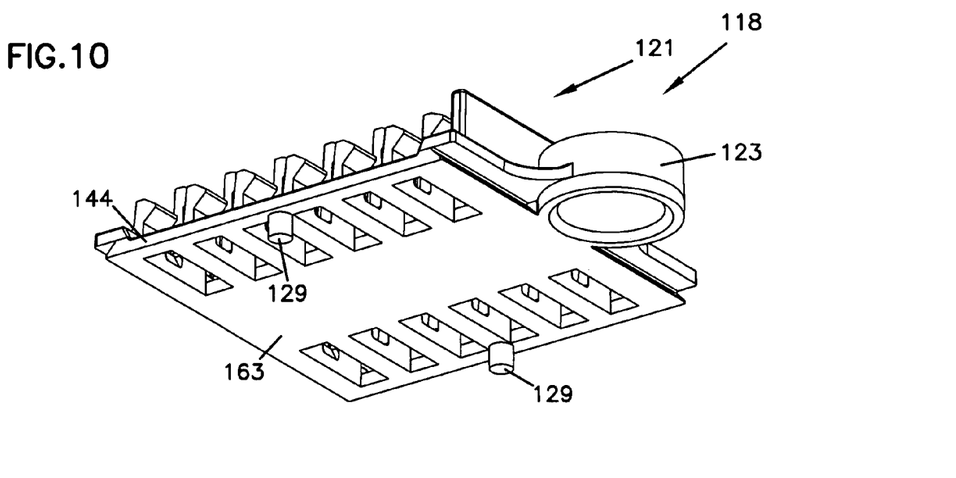
FIG. 10 is a bottom perspective view of the splice chip of FIG. 7.

The second embodiment of the splice tray arrangement 110, however, includes a mounting arrangement 184 that is different than the arrangement 84 of the first embodiment. In the illustrated embodiment of FIGS. 6-10, the mounting arrangement 184 includes a collar 123 located at an end 121 of the splice chip 118. The collar 123 is configured to receive a pin or plug 125 (FIG. 6) of the tray 116. In the illustrated embodiment, the plug 125 includes flexible portions 127 that flex inward toward one another to accept annular placement of the collar 123 about the plug 125. As can be understood, the collar 123 snap-fits onto the plug 125 and is retained by a plug cap 133. Referring now to FIG. 10, the splice chip further including guide pins 129 extending outward from a bottom side 163 of the base 144 of the splice chip 118. The guide pins 129 are received within holes 131 (FIG. 6) formed in tray 116. The guide pins 129 assist in properly aligning the splice chip in relation to the tray, and also prevent rotation of the splice chip 118 about the plug 125.

The overall arrangement and construction of the disclosed splice tray arrangements 10, 110 enhances cable management by providing a splice chip design that is easy to use (e.g. the splice elements simply snap into a secured location) and increases splice element capacity. The above specification provides a complete description of the invention. Since many embodiments of the invention can be made without departing from the spirit and scope of the invention, certain aspects of the invention reside in the claims hereinafter appended.

What is claimed is:

1. A splice chip, comprising:
   a) a base;
   b) a plurality of arms projecting outward from the base, the plurality of arms including a plurality of longer arms and a plurality of shorter arms, the arms defining channels having a height sized to receive multiple splice elements in a stacked relationship, the height of each of the channels being defined by a first channel region and a second channel region of the channel; and
   c) retaining structure arranged to retain a splice element in both of either one of the first channel region and the second channel region.

2. The splice chip of claim 1, wherein the retaining structure includes tabs located at an end of each of the arms.

3. The splice chip of claim 1, wherein the plurality of longer arms includes first and second rows of longer arms, and the plurality of shorter arms includes first and second rows of shorter arms.

4. The splice chip of claim 3, further including a plurality of dividers located between the first and second rows of longer arms.

5. The splice chip of claim 1, wherein the retaining structure includes tabs located at an end of each of the longer arms and each of the shorter arms.

6. The splice chip of claim 5, wherein the arms are flexible arms, and wherein the tabs and the flexible arms permit a splice element to be snap-fit into both of either one of the first channel region and the second channel region.

7. The splice chip of claim 1, further including longitudinal guides for mounting the splice chip to a splice tray, the longitudinal guides extending outward beyond first and second ends of the base.

8. The splice chip of claim 1, further including guide pins for mounting the splice chip to a splice tray, the guide pins extending outward from a bottom surface of the base.

9. The splice chip of claim 1, wherein the first channel region is an upper channel region and the second channel region is a lower channel region.

10. A method of mounting a splice element, the method comprising the steps of:
    a) providing a splice chip having a plurality of arms, a plurality of channels, and splice element retaining structure, the plurality of arms including longer arms and shorter arms, each of the channels including a first channel region and a second channel region; and
    b) mounting a splice element in a selected one of the first channel region and the second channel region, wherein the splice element retaining structure is arranged to retain the splice element in both of either one of the first channel region and the second channel region.

11. The method of claim 10, wherein the step of mounting the splice element includes flexing a longer arm to place the splice element with the second channel region, the splice element being retained within the second channel region by the splice element retaining structure.

12. The method of claim 11, wherein the step of mounting the splice element further includes flexing a shorter arm to place the splice element within the first channel region, the splice element being retained within the first channel region by the splice element retaining structure.

13. A splice chip, comprising:
    a) a base having a first end and an opposite second end, the base including a bottom side and a top side;
    b) a plurality of arms projecting outward from the top side of the base, the arms defining channels for receiving splice elements; and
    c) first and second guides extending outward in a lateral direction beyond the first and second ends of the base, the guides being offset from the bottom side of the base;
    d) wherein the first and second ends of the base include an angled portion, the angled portions and the offset guides defining an interlocking space therebetween.

14. The splice chip of claim 13, wherein the plurality of arms include a plurality of longer arms and a plurality of shorter arms.

15. A splice tray arrangement, comprising:
    a) a tray having a splice chip mounting location;
    b) a splice chip positioned at the mounting location, the splice chip including a plurality of splice holding structures; and
    c) a mounting arrangement for securing the splice chip to the tray at the mounting location, the mounting arrangement including:
        i) interlocking guides provided on each of the splice chip and the tray, wherein the interlocking guide provided on the splice chip extends outward from one of a first end and a second end of the splice chip, and wherein the interlocking guide provided on the tray includes at least a first track configured to receive the interlocking guide of the splice chip; and
        ii) at least one flexible tab provided on the tray and arranged to prevent lateral movement of the splice chip when the splice chip is positioned at the mounting location.

16. The arrangement of claim 15, wherein the interlocking guides of the splice chip and the tray prevent transverse movement of the splice chip relative to a mounting surface of the tray.

17. The arrangement of claim 15, wherein the interlocking guides of the tray and the splice chip include the first track and a second track provided on the tray, and first and second ledges that extend outward from the first and second ends of the splice chip.

18. The arrangement of claim 15, wherein the at least one flexible tab includes a ramped surface, the tab being arranged to flex to a position flush with a mounting surface of the tray while the splice chip is being positioned at the mounting location.

19. The arrangement of claim 15, including first and second flexible tabs, each of the flexible tabs including a ramped surface and a shoulder surface, the ramped surfaces being arranged such that the splice chip can be mounted at the mounting location from opposite directions.

20. The arrangement of claim 19, wherein the shoulder surface of the flexible tabs prevent lateral movement of the splice chip when the splice chip is positioned at the splice chip mounting location.

21. A method of mounting a splice chip to a splice tray, the splice chip including a base and a plurality of splice holding elements extending from the base, the method comprising the steps of:
   a) sliding a bottom surface of the base of the splice chip in a lateral direction along a mounting surface of the splice tray;
   b) engaging interlocking guides of the splice chip with corresponding interlocking guides of the splice tray to secure the splice chip in relation to the splice tray;
   c) flexing a first tab from a first position to a second position flush with the mounting surface while sliding the splice chip in the lateral direction; and
   d) contacting a second tab that prevents the splice chip from further sliding in the lateral direction, wherein the first tab returns to the first position upon contacting the second tab.

22. A splice tray arrangement, comprising:
   a) a tray having a splice chip mounting location;
   b) a splice chip positioned at the mounting location, the splice chip including a plurality of splice holding structures; and
   c) a mounting arrangement for securing the splice chip to the tray at the mounting location, the mounting arrangement including:
      i) interlocking guides disposed on each of the splice chip and the tray, the interlocking guides including first and second ledges extending outward from first and second ends of the splice chip and first and second tracks disposed on the tray; and
      ii) at least one flexible tab arranged to prevents lateral movement of the splice chip when the splice chip is positioned at the mounting location.

23. A splice tray arrangement, comprising:
   a) a tray having a splice chip mounting location;
   b) a splice chip positioned at the mounting location, the splice chip including a plurality of splice holding structures; and
   c) a mounting arrangement for securing the splice chip to the tray at the mounting location, the mounting arrangement including:
      i) interlocking guides disposed on each of the splice chip and the tray; and
      ii) first and second flexible tabs arranged to prevent lateral movement of the splice chip when the splice ship is positioned at the mounting location, each of the flexible tabs including a ramped surface and a shoulder surface, the ramped surfaces being arranged such that the splice chip can be mounted at the mounting location from opposite directions.

24. The arrangement of claim 23, wherein the shoulder surface of the flexible tabs prevent lateral movement of the splice chip when the splice chip is positioned at the splice chip mounting location.

25. A method of mounting a splice chip to a splice tray, the splice chip including a base and a plurality of splice holding elements extending from the base, the method comprising the steps of:
   a) sliding a bottom surface of the base of the splice chip in a lateral direction along a mounting surface of the splice tray;
   b) engaging interlocking guides of the splice chip with corresponding interlocking guides of the splice tray to secure the splice chip in relation to the splice tray;
   c) flexing a first tab from a first position to a second position flush with the mounting surface while sliding the splice chip in the lateral direction; and
   d) contacting a second tab that prevents further lateral movement of the splice chip beyond a mounting location, wherein the first tab returns to the first position when the splice chip reaches the mounting location.

26. A splice chip, comprising:
   a) a base; and
   b) a plurality of arms extending outward from the base, the arms defining channels for receipt of splice elements, the plurality of arms including:
      i) a first set of arms having a first height, the arms of the first set including retaining structure for retaining splice elements at a first position; and
      ii) a second set of arms having a second height greater than the first height, the arms of the second set including retaining structure for retaining splice elements at a second position;
      iii) wherein the arms of the first set support the splice element at a spaced distance above the base when retained in the second position.

27. The splice chip of claim 26, wherein the arms are flexible arms, and wherein the retaining structure and the flexible arms permit a splice element to be snap-fit into both of either one of the first and second positions.

28. The splice chip of claim 26, wherein the retaining structure includes tabs located at an end of each of the arms.

29. The splice chip of claim 26, wherein each of the arms is positioned in a row of arms having the same height.

30. The splice chip of claim 26, further including longitudinal guides for mounting the splice chip to a splice tray, the longitudinal guides extending outward beyond first and second ends of the base.

31. The splice chip of claim 26, further including guide pins for mounting the splice chip to a splice tray, the guide pins extending outward from a bottom surface of the base.

32. The splice chip of claim 26, wherein the first and second positions are positions with a channel defined by the arms, and the first position being located below the second position.

33. A splice tray arrangement, comprising:
   a) a tray having a splice chip mounting location;
   b) a splice chip positioned at the mounting location, the splice chip including a plurality of splice holding structures; and
   c) a mounting arrangement for securing the splice chip to the tray at the mounting location, the mounting arrangement including:
      i) interlocking guides provided on each of the splice chip and the tray; and
      ii) at least one flexible tab provided on the tray, the tab including a ramped surface, the tab being arranged to flex to a position flush with a mounting surface of the tray while the splice chip is being positioned at the mounting location, the tab preventing lateral movement of the splice chip when the splice chip is positioned at the mounting location.

* * * * *